Nov. 5, 1968   C. W. LAWTON   3,409,274
MIXING APPARATUS FOR HIGH PRESSURE FLUIDS
AT DIFFERENT TEMPERATURES
Filed Nov. 22, 1967

INVENTOR
CARL W. LAWTON

By John L. Carney
ATTORNEY

3,409,274
MIXING APPARATUS FOR HIGH PRESSURE
FLUIDS AT DIFFERENT TEMPERATURES
Carl W. Lawton, West Hartford, Conn., assignor to Combustion Engineering, Inc., Windsor, Conn., a corporation of Delaware
Continuation-in-part of application Ser. No. 603,007, Dec. 19, 1966. This application Nov. 22, 1967, Ser. No. 689,235
7 Claims. (Cl. 259—4)

ABSTRACT OF THE DISCLOSURE

Mixing apparatus for high pressure fluids at different temperatures in the form of a T-connector, wherein the effect of thermally induced stresses on the body of the apparatus, especially at the intersection of the stem and the straight portion which is most susceptible to stress, is reduced by providing the straight portion with an inner liner which defines an annular chamber about the wall of the body into which fluid from the stem is discharged. The body of liquid in the chamber forms a thermal barrier that prevents the apparatus body from being subjected to undue thermal stresses. Openings in the liner effect passage of fluid from the chamber into the flow stream of the other fluid for mixing.

Background of the invention

This application is a continuation-in-part of U.S. application Ser. No. 603,007 filed Dec. 19, 1966, now abandoned.

The invention relates to fluid mixing apparatus and in particular to mixing vessels wherein two high pressure fluids having substantially different temperatures can be mixed.

In certain fields, especially the field of vapor generation, it is often desirable to mix fluids, each being at substantially different temperatures from one another. A particular application is in a vapor generator wherein some of the high temperature, high pressure, saturated liquid from the outlet of the water wall heat exchange surface is recirculated back through the water walls. Before being readmitted to the water walls, this liquid must be mixed with lower temperature liquid that is passed from the economizer. The temperature of the saturated liquid may be as high as 800° F. while that of the liquid being passed from the economizer may be about 500° F. to 600° F. thereby giving rise to a substantial temperature difference, and with it, the problem of extreme thermal stresses to be encountered by the vessel within which mixing of these fluids occurs. The magnitude of the thermal stresses generated in vessels employed to mix such fluids has heretofore prevented the use of simple, conventional tube connectors. As an alternative, complex, expensive structures had to be employed. One such structure is the spherical mixing vessel shown and described in U.S. Patent No. 3,291,456, issued Dec. 13, 1966, to Deane and assigned to the assignee of the instant application.

Summary of the invention

By means of the present invention there is provided mixing apparatus constructed in the form of a simple T-type fluid connector having a straight portion and intersecting stem that can be installed in the juncture of the tubes conducting the two fluids to be mixed. Within the apparatus a liner is disposed in concentric relation to the straight portion of the T and is spaced from the wall thereof so as to form a substantially closed, annular chamber into which fluid flowing from the second fluid inlet defined by the stem is conducted. Openings in the wall of the liner effect mixing of the two fluids. The body of liquid retained in the annular chamber provides a thermal barrier effective to prevent the material forming the apparatus from being subjected to undue thermal stressing because of the substantial temperature differential imposed by the two fluids. Utilization of the apparatus, which is of substantially conventional form and therefore simple and inexpensive to construct, permits the mixing of high temperature, high pressure fluids at a fraction of the cost heretofore required.

Description of the preferred embodiments

Figure 1:
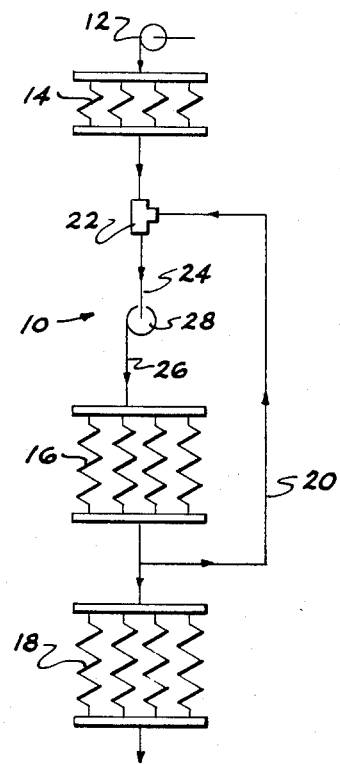
FIGURE 1 is a schematic representation of a vapor generator incorporating the instant invention.

In FIGURE 1, numeral 10 indicates a vapor generator incorporating the present invention. The vapor generator 10 comprises a feed pump 12, an economizer 14, water wall heat exchange surface 16 and superheater 18, all connected for series flow. A portion of the fluid emerging from the outlet of the water wall surface 16 is recirculated, through line 20, back to the inlet of the water walls where, before being admitted thereto, it is mixed in mixing vessel 22 with fluid flowing from the economizer 14 through line 24, and then passed, by means of line 26 and recirculating pump 28 to the water walls 16.

Figure 2:
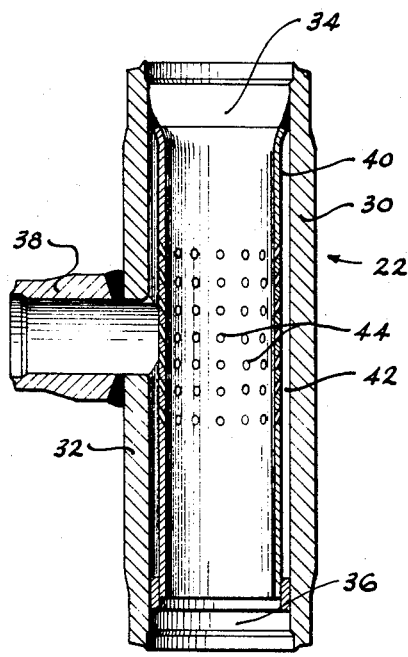
FIGURE 2 is a sectional view of mixing apparatus according to the instant invention as applied in the vapor generator of FIGURE 1.

As shown in FIGURE 2 the mixing vessel 22 comprises a body 30 that is of substantially standard T-connector configuration having a straight portion 32 with two open ends 34 and 36, respectively, and a stem 38 disposed at right angles with respect to, and penetrating, the straight 32. The ends 34 and 36, and stem 38 are adapted for connection at the intersection of the tubes 20, 24, and 26 by appropriate means such as welding. In the present arrangement, end 34 of the straight 32 forms the inlet opening for one of the fluids being mixed, while end 36 forms the outlet opening for the mixed fluid. The opening in stem 38 provides the inlet for the second fluid to be mixed. Within the body of the vessel 22 is disposed an elongated cylindrical liner 40 extending axially from end to end through the straight 32. The liner 40 is concentrically spaced from the wall of the straight 32 and cooperates therewith to define a substantially annular chamber 42 that is closed at its ends. The second fluid inlet defined by stem 38 communicates with the chamber 42 such that the chamber is caused to contain a body of fluid that provides thermal insulation for the metal that forms the body of the vessel 22.

In order to provide for thermal expansion of the liner 40 with respect to the body of vessel 22 it is preferred that it be attached as by means of welding to the body at one of its ends, here shown as the end 34, while the other end of the liner engages the inner surface of the body in sliding contact adjacent the other end 36.

Openings 44 are provided in the wall of the liner 40 to effect passage of the fluid stream entering the vessel through the opening provided by stem 38 into the fluid stream passing through the interior of the liner 40 where mixing occurs. The openings 44 are conveniently formed of rows of circular apertures that penetrate the wall of the liner. In order to obtain better mixing of the fluids, the openings 44 are provided about the full circumference of the liner wall and may, as shown in FIGURE 2, be inclined in the direction of flow of fluid through the liner in order to somewhat reduce the amount of pressure drop experienced by the fluid in flowing through the apparatus. Where, however, more pressure drop can be tolerated or where better mixing is desired, it is recommended that the openings be radially projected through the liner wall in order that some turbulence be effected within the liner to promote mixing.

For best results it is further recommended that the total cross sectional area of the holes 44 should be less than half the flow cross section of the inlet branch 38, most preferably approximately 35% of the flow cross section of the latter. In this manner, the fluid jets created by the fluid flowing through the openings 44 from the nozzle 38 will penetrate the body of liquid flowing through the straight portion 32 between the inlet and outlet ends 34 and 36 to a sufficient depth to obtain abundant mixing.

According to the invention, the openings 44 are provided only in that axial portion of the liner 40 that is adjacent the fluid inlet defined by the stem 38. The remainder of the liner wall on both sides of the apertured portion is fluid impervious in order to create areas of low fluid velocities in the adjacent portions of the chamber 42. By maintaining low fluid velocities within the chamber 42 the body of liquid contained therein is caused to operate as a thermal barrier for, as the velocity of the fluid within the chamber decreases, its temperature will tend to assume that of the fluid entering the liner 40 through the first fluid inlet opening 34. Since the velocity of the fluid in the chamber 42 decreases axially along the length of the straight 28 to the end of the chamber, its temperature will therefore tend more and more to that of the fluid flowing through the liner with the maximum effect being realized at the end of the chamber where the fluid velocities are at a minimum. Thus the temperature of the material that forms the apparatus will experience only gradual temperature gradients along the length of the straight and therefore, thermal stresses within the member can be maintained within tolerable limits. Moreover, because the fluid velocity in the chamber 42 is greatest adjacent the second fluid inlet defined by the intersecting of the stem 38 and straight 32 which is the area most susceptible to stress, the temperature gradient in this area will be minimized thereby eliminating the danger of material failure at this point.

The operation of the present invention is described with reference to its use in the vapor generator organization shown in FIGURE 1 where the fluid being passed through line 20 may be of the order of 800° F. and that emerging from the economizer 14 and passed through line 24 is about 600° F. The mixing vessel 22 is installed at the intersection of lines 20, 24, and 26 with its first fluid inlet end 34 connected to line 20, its mixed fluid outlet end 36 connected to line 26 and its stem 38 forming the second fluid inlet connected to line 24. The cooler (600° F.) liquid therefore is caused to pass through the interior of liner 36 along the length of the straight 32 while the hot (800° F.) recirculated liquid entering through stem 38 is passed to the annular chamber 42 filling the same to form a thermal barrier along the length of the straight 28. The hotter liquid is caused to pass through the openings 44 in liner 40 from the chamber 42 into the interior of the liner where it is mixed with the cooler liquid and flows out the mixed fluid outlet 36 into line 26. Within the chamber 42 the temperature of the hotter liquid tends to decrease along the length of the chamber from the inner section of the stem 38 to the ends thereof. Since this liquid gives up heat to the cooler fluid and thereby assumes a temperature intermediate that of the two liquids being mixed, it acts as a thermal shield for the wall of the straight thus preventing direct contact of the high temperature fluid with the body. Because of the presence of the thermal shield and because the openings in the liner 40 which produce the highest liquid velocities within the chamber 42 are located in the area of the inner section of the stem 38 with the straight 32 the temperature gradient at this point, which is the most susceptible to failure, is at a minimum. Furthermore, because the temperature of the liquid within chamber 42 gradually decreases from this point to the ends thereof the metal temperatures experienced by the body of the straight gradually decrease along the length of the body 30 such that the temperature gradient at any point is slight. The result therefore is that the simple T-connection can be employed to mix high pressure liquids having different temperatures without danger of stressing the material beyond tolerable limits.

Although the invention has been described with reference to an application wherein the cooler of the fluids being mixed is caused to enter the inlet 34 with the hotter fluid entering the inlet 38 it should be understood that the apparatus will operate equally as well when the fluids admitted to the two inlets are reversed, i.e. with the hotter fluid being admitted to the inlet 34 and the cooler fluid to inlet 38.

Figure 3:
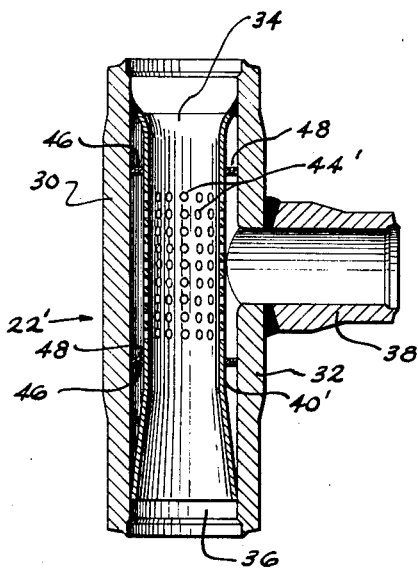
FIGURE 3 is a sectional view of a modified form of mixing apparatus according to the invention.

In FIGURE 3 there is shown a somewhat modified application of the present invention. In this arrangement the liner indicated as numeral 40' is formed with a venturi constriction located adjacent the intersection of the stem 38 and the straight 32. Openings 44', here shown as being radial, are disposed about the circumference of the liner in the constricted portion thereof. By employing a liner so formed the fluid pressure at the constriction is reduced so as to enhance the entry of fluid flowing from the chamber 42 into the interior of the liner in order to promote mixing thereof. In this modification there are also shown annular baffle members 46 disposed in the annular chamber 42 between the walls of the liner 40' and vessel body 22. Openings 48 are provided in the baffles such that some fluid circulation therethrough can occur.

By means of these baffle members the liner 40' is provided with lateral structural support for maintaining it in spaced relation from the wall of the body 30. Moreover, the presence of these baffle members also promotes fluid stagnation in the remote ends of the chamber 42 between the external surface of the liner 40' and inner surface of the body 30. Thus, the tendency of the fluid residing in the remote portions of the chamber 42 to assume the temperature of the fluid flowing in the adjacent portion of the interior of the liner is increased thereby further reducing the thermal gradients along the length of the vessel body 30.

It is particularly recommended that, in a mixing vessel of the type disclosed in this embodiment wherein the line 40' is formed with a venturi constriction adjacent the inlet opening formed by the stem 38, that the flow area presented by the openings 44' be limited to less than half, and ideally about 35%, that presented by the internal diameter or the stem 38. To so limit the flow area through the liner wall insures adequate penetration of the stream of fluid flowing axially of the liner by that entering through the openings. In this manner complete mixture of the two fluids through the entire transverse area of the liner interior is enhanced.

It will be understood that various changes in the details, materials and arrangements of parts which have been herein described and illustrated in order to explain the nature of the invention, may be made by those skilled in the art within the principle and scope of the invention as expressed in the appended claims.

What I claim is:

1. In a vapor generator having tubulous heat exchange means for the heating of fluid by the indirect exchange of heat from a heating medium, means for passing fluid to be heated through the tubes of said heat exchange means, and means for withdrawing a portion of the heated fluid downstream of said heat exchange means and for recirculating said heated fluid therethrough in mixed relation with said fluid to be heated, apparatus for mixing said fluids comprising:

(a) a vessel body having an open ended straight portion and an angularly disposed, hollow stem penetrating the wall of said straight portion intermediate the ends thereof, one end of said straight portion forming an inlet for one of said fluids to be mixed and the other end forming a mixed fluid outlet, said stem forming an inlet for the other of said fluids;

(b) means forming a liner disposed within the straight portion of said vessel in spaced relation from the wall thereof to form a substantially closed annular chamber extending between the ends of said straight portion and communicating with the inlet formed by said stem;

(c) means forming openings in the wall of said liner adjacent the locus of penetration of said stem, the remainder of said liner wall being fluid impervious.

2. Apparatus as recited in claim 1 wherein the flow area presented by said openings is less than half that presented by the internal diameter of said stem.

3. Apparatus as recited in claim 2 wherein the flow area presented by said openings is substantially thirty-five percent that presented by the internal diameter of said stem.

4. Apparatus as recited in claim 2 wherein said liner contains a venturi constriction adjacent the locus of penetration of said stem.

5. Apparatus as recited in claim 4 wherein said openings are circumferentially spaced around the constricted portion of said liner.

6. Apparatus as recited in claim 4 including:

(a) annular baffle members spacedly supporting said liner with respect to the inner surface of the straight portion of said vessel, said baffle members being disposed on opposite sides of the locus of penetration in spaced relation from the ends of said chamber; and (b) means forming openings through said baffle members for passing fluid therethrough.

7. Apparatus as recited in claim 1 wherein said liner is fixedly attached to the wall of said vessel adjacent one end thereof and in sliding contact with said wall at the other end thereof.

References Cited

UNITED STATES PATENTS

| | | | |
|---|---|---|---|
| 1,784,503 | 12/1930 | Swann | 259—151 |
| 1,848,122 | 3/1932 | Forster | 259—151 |
| 2,577,664 | 12/1951 | Pro | 259—151 |

ROBERT W. JENKINS, *Primary Examiner.*